United States Patent Office 3,318,452
Patented May 9, 1967

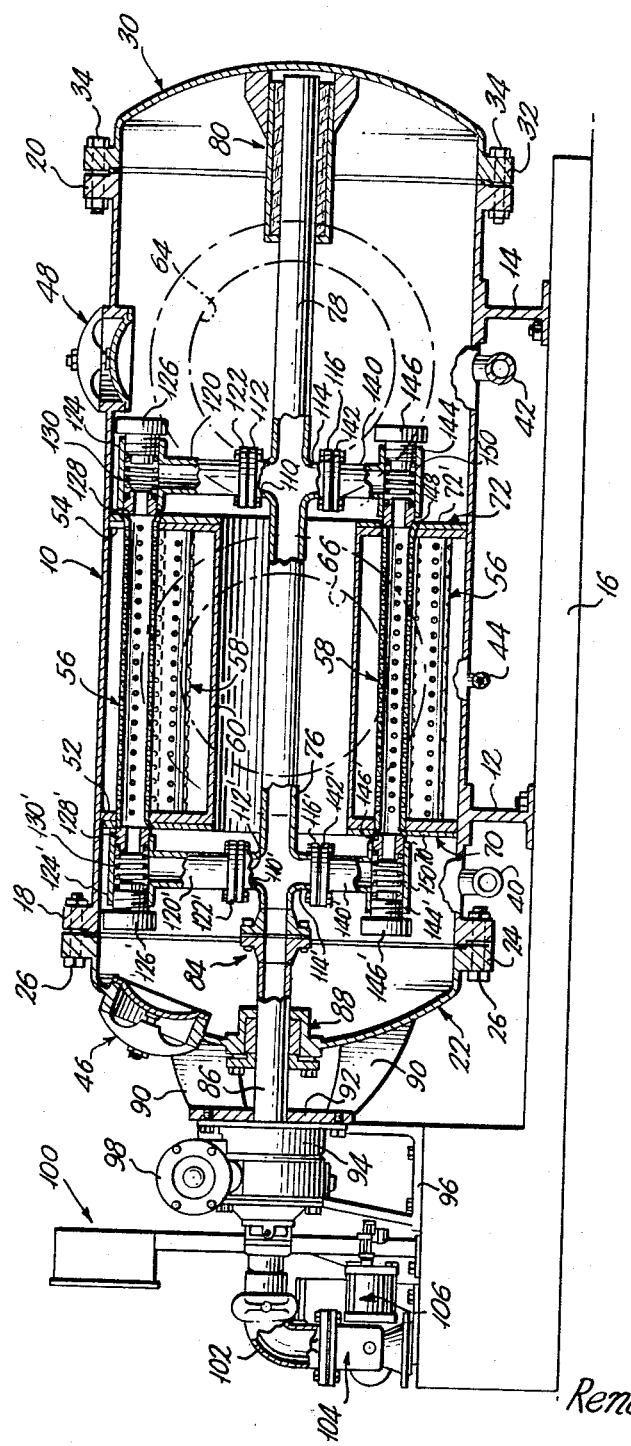

3,318,452
BACKWASH MEANS FOR AN OPEN ENDED MULTIPLE TUBE FILTER ASSEMBLY
Renard P. Adams, 87 Nottingham Terrace,
Buffalo, N.Y. 14216
Filed Feb. 1, 1966, Ser. No. 524,276
10 Claims. (Cl. 210—333)

The present invention relates to filtering apparatus, and more particularly to filtering apparatus including filter tubes that can be backwashed.

The present invention represents an improvement over the filtering apparatus shown in U.S. Patent No. 3,176,846. In the present invention as in the aforementioned patent, a plurality of filter tubes are provided wherein individual ones of the filter tubes may be backwashed while the device is in operation without necessitating the shutdown of the entire apparatus for the cleaning operation. The clean or filtered water is used as the backwash medium, the individual filter tubes being backwashed one at a time in a sequential manner.

The present invention also incorporates the feature of providing a backwash means that has no movable clearances with respect to the filter tubes and wherein no relative longitudinal movement or displacement is required of the backwash means with respect to the filter tubes, but only relative rotational movement occurs during operation of the apparatus.

A particular feature of the present invention is to substantially double the capacity of the individual tubes of the apparatus by providing double the entrance area of the tubes. This is accomplished by providing open ends at the opposite end portions of each of the filter tubes with the full inlet pressure applied to both open ends of the filter tubes. With this arrangement, each filter tube of the present invention gives the effect of two filter tubes as shown in the aforementioned patent wherein only one end portion of the filter tube is open to the inlet pressure.

In addition, each of the individual filter tubes of the present invention is backwashed simultaneously from opposite open ends thereof to enable each filter tube to be backwashed in a more effective and efficient manner than obtainable with the arrangement as shown in the aforementioned patent, and at the same time providing more uniform backwashing of the individual filter tubes.

These objectives of the present invention are accomplished while maintaining the over-all longitudinal dimension of the apparatus at a minimum. In other words, the additional functions of the present invention are provided by structure which occupies only slightly more space than that required in the aforementioned patented arrangement.

The present invention also incorporates a construction wherein more filter tubes are provided for a given cross sectional area of the apparatus. This is accomplished by providing a plurality of annular rows of tubes which are staggered with respect to one another in such a manner that the cooperating backwash means is capable of backwashing only a single filter tube at a time while allowing all of the remaining filter tubes to continue in operation.

A further important feature of the present invention is the arrangement which provides ready accessibility and removability of the filter tubes for inspection and replacement as desired. The inlet section of the filter housing is provided with a removable cover, and the filter tubes may be readily removed by disassembly of the outboard backwash structure and the inlet ring means without disturbing the piping operatively associated with the filtering apparatus.

An object of the present invention is to provide new and novel filtering apparatus which substantially doubles the capacity of the filter tubes as compared with filter tubes of the prior art which are open at only one end thereof.

Another object of the invention is to provide filtering apparatus wherein the backwashing function may be carried out in a more efficient and effective manner and to provide more uniform results.

Still another object of the invention is the provision of filtering apparatus which incorporates more filter tubes for a given cross sectional area and which includes backwash means adapted to backflush a single filter tube at a time.

Yet another object of the present invention is to provide filtering apparatus so constructed as to enable ready removability of the filter tubes for inspection and replacement as required without disturbing the piping connected with the apparatus.

A still further object of the invention is the provision of filtering apparatus which is quite simple and compact in construction, and yet which at the same time is quite efficient and reliable in use.

Other objects and many attendant advantages of the invention will become more apparent when considered in connection with the specification and accompanying drawings, wherein the single figure of drawings represents a longitudinal section through the filtering apparatus of the present invention.

Referring now to the drawing, the filter housing includes a main cylindrical body portion 10 having a pair of downwardly extending support portions 12 and 14 fixed thereto for supporting the filter housing on a suitable base means 16. The cylindrical main body portion 10 is provided with a pair of integral annular radially outwardly extending flanges 18 and 20 at opposite ends thereof.

A first end cover 22 of substantially dome-shaped configuration is provided with an annular flange 24, the flanges 18 and 24 having aligned holes formed therethrough for receiving nut and bolt assemblies 26 for retaining the end cover 22 in the operative position illustrated.

An end cover 30 is provided at the opposite end of the filter housing, end cover 30 having an annular flange 32 formed thereon. Flanges 20 and 32 have aligned holes formed therethrough for receiving nut and bolt assemblies 34 which retain the end cover 30 in the operative position illustrated.

A first pair of drains 40 and 42 are provided in communication with the inlet section hereinafter more fully defined, and another drain 44 is in communication with the outlet section as hereinafter defined. A pair of inspection covers 46 and 48 are provided in the walls of the end cover 22 and the cylindrical main body portion 10 respectively for gaining access to the interior of the filter housing at opposite sides of the outlet section hereinafter described.

A pair of spaced substantially parallel annular tube plates 52 and 54 are provided, these annular tube plates being suitably secured to the inner surface of the cylindrical body portion 10, each of the tube plates having a plurality of holes formed therein, the holes being of any suitable number to support the desired number of filter tubes between the tube plates, and it is apparent that the holes may be of any size so as to receive tubes of the desired diameter. A first annular row of filter tubes 56 is provided, the opposite ends of each of these tubes being disposed within the holes in the opposite tube plates 52 and 54. A similar annular row of filter tubes 58 are supported at the opposite ends thereof within suitable holes provided in the tube plates. The annular rows 56 and 58 of the filter tubes are disposed concentric with one another, and the tubes of the two rows are in staggered relationship so that they are not radially aligned with one another. Each of the filter tubes is of substantially cylindrical configuration and has discharge means formed therethrough substantially throughout the length thereof, the discharge means including longitudinally spaced and circumferentially spaced discharge portions about the outer periphery of the tubes. This discharge means may take the form of a plurality of spaced holes formed through the tubes or may include slot means and the like formed in the tubes. The various filter tubes are disposed in substantially parallel relationship with one another, and the outer periphery of each tube is disposed a substantial distance from the outer peripheries of adjacent tubes.

A generally cylindrical member 60 has the opposite ends thereof suitably secured to annular tube plates 52 and 54. The outlet section of the filtering apparatus is defined between tube plates 52, 54, cylindrical member 60 and the inner wall of the main body portion 10 of the filter housing. It will accordingly be apparent that the outlet section in the present invention is of annular configuration. The inlet section of the apparatus includes the remaining interior portion of the filter housing other than the outlet section described hereinabove. An inlet conduit 64 is in communication with the inlet section of the apparatus, and an outlet conduit 66 is in communication with the outlet section of the apparatus, each of these conduits being sealingly connected with the outer wall of the main body portion 10 of the filter housing.

A first annular inlet ring 70 is suitably removably secured in the operative position shown, this inlet ring including a substantially planar outwardly facing bearing surface 70'. The inlet ring is provided with a plurality of inlet ports which are adapted to be aligned with the holes in the tube plate 52 and the open ends of the adjacent filter tubes. In a similar manner, an annular inlet ring 70 is removably secured in the operative position shown, this inlet ring defining an outwardly facing generally planar bearing surface 72'. Inlet ring 72 is provided with a plurality of inlet ports adapted to be aligned with the holes formed in the tube plate 54 and the open ends of the adjacent filter tubes. The annular inlet rings may serve the dual purpose of holding the filter tubes in operative position and may be formed of a suitable bearing material for cooperation with the sealing sleeves hereinafter described. The inlet rings in a typical example may be formed of bronze.

The backwash means includes a longitudinally extending hollow portion 76 including an end portion 78 seen at the right-hand part of the figure of drawing, this end portion 78 being rotatably journalled within a bearing means indicated generally by reference numeral 80. No backwash liquid will move through this end portion 78 and the bearing 80 during operation, and this serves effectively as a closed end of the longitudinally extending hollow portion 76 and serves to support the backwash means at the outboard end thereof.

The opposite end of the longitudinally extending hollow portion 76 of the backwash means is connected through a coupling 84 with a further longitudinally extending hollow portion 86 which extends outwardly through a sealing means indicated generally by reference numeral 88 for providing a liquid-tight seal between the backwash means and the filter housing at this point.

A pair of arms 90 extend outwardly from end cover 22 and support a plate 92. Bearing means 94 is in turn supported from plate 92, the bearing means serving to rotatably support the hollow outwardly extending portion 86 of the backwash means.

A support means 96 is provided on base means 16 and supports a gear motor drive means 98 which is suitably drivingly connected through the intermediary of a hollow shaft speed reducer with the hollow backwash portion 86 for rotating the backwash means to sequentially backflush the filter tubes as hereinafter described. A control means for operating the drive motor 98 is indicated generally by reference numeral 100.

The outer end of the hollow backwash portion 86 is in turn connected with a conduit portion 102 having an outlet valve 104 operatively connected therein for controlling the flow of backwash liquid outwardly of the filtering apparatus. The operating mechanism for valve 104 is indicated by reference numeral 106. This outlet valve is used to shut off the flow of backwash liquid when the need for cleaning the filter tubes ceases. This valve thereby prevents backwash liquid from continuing to flow out of the apparatus if the backwash means hereinafter described in aligned with the open ends of a particular tube. This valve which may for example be air or electrically operated is accordingly opened only when backwashing is in process.

The longitudinally extending hollow portion 76 of the backwash means includes radially outwardly extending portion 110 terminating in a flange 112 and a diametrically opposite radially extending portion 114 terminating in a flange 116. A hollow portion 120 includes a flange 122 suitably secured to flange 112 so that portion 120 can be removed from the operative position shown when described. The outer end of portion 120 is in communication with a longitudinally extending sleeve 124 which is open at the opposite ends thereof. The right-hand end portion of the sleeve as seen in the drawing is threaded and receives a threaded plug member 126. An inner sealing sleeve 128 has a central bore formed therethrough and is slidably positioned within the opposite open end of sleeve 124. A compression spring 130 is disposed between the threaded plug and the inner sealing sleeve 128 for urging the sealing sleeve into engagement with the inlet ring 72. The compression spring 130 maintains sleeve 128 in liquid-tight abutting relationship with ring 72 and the spring compensate for any uneven surfaces in the inlet ring so that a perfect liquid-tight seal is always provided because of this floating sealing relationship.

A hollow portion 140 includes a flange 142 which is suitably secured to the flange 116. Portion 140 is in communication with a longitudinally extending sleeve 144 open at both ends thereof. A threaded plug 146 is threaded in the right-hand end portion of the sleeve which is correspondingly threaded. An inner sealing sleeve 148 has a bore formed therethrough and is slidably positioned within the opposite open end of sleeve 144. A compression spring 150 is disposed between plug 146 and inner sealing sleeve 148 for biasing it into liquid-tight sealing engagement with the surface 72' of member 72. It will be noted that in both cases the inner sealing sleeves are resiliently urged into engagement with the outer planar surface 72' of the inlet ring 72.

It will also be noted that the hollow radially extending portions 120 and 140 are of different length. With this arrangement, the inner sealing sleeve 128 is adapted to be aligned with the ports provided in inlet ring 72 which are in alignment with the open ends of the outer annular row of filter tubes. The inner sealing sleeve 148, on the other hand, is so positioned as to be aligned with the ports in the inlet ring which are aligned with the inner annular row of filter tubes. For the sake of illustration, the inner sealing sleeves 128 and 148 are both shown as being aligned with a filter tube. In actual practice, the filter tubes are so staggered that when the inner sealing sleeve 128 is aligned with the open ends of one of the filter tubes in the outer annular row of tubes, the inner sealing sleeve 148 is not aligned with one of the open ends of the filter tubes of the inner annular row of filter tubes, and vice versa. With this arrangement, only one filter tube will be backwashed at any particular time.

The backwash means associated with annular inlet ring 72 has been described, and it will be noted that similar backwash means is operatively associated with the annular inlet ring 70 at the opposite end of the outlet section. This similar backwash structure provided at an axially spaced portion of the hollow backwash portion 76 has been given the same reference numerals primed since the structure is identical. It will be understood that this axially spaced backwash arrangement is such that the opposite ends of a particular filter tube will be simultaneously aligned with the backwash means so that the backwash will take place in opposite directions through the particular filter tube.

It is apparent from the foregoing that there is provided according to the present invention new and novel filtering apparatus wherein the capacity of each filter tube is substantially doubled as compared to the arrangement wherein a single filter tube is open at only one end thereof. In the present invention, each filter tube is open at opposite ends thereof so that the raw liquid entering the apparatus is distributed equally to both ends of each of the tubes through the hollow interior of member 60. The filter tubes are readily accessible by removing the end cover 30 and dismantling the outboard backwash means 120 and 140 along with the associated components, whereupon ring 72 may be removed so that the filter tubes can be taken out and replaced without disturbing the remaining piping as illustrated in the left-hand portion of the drawing. More uniform backwashing is obtained with the arrangement of the present invention and each filter tube may be backwashed in a more effective and efficient manner. More filter tubes may be placed in a given cross sectional area with the arrangement of the present invention incorporating a plurality of annular rows of filter tubes disposed in staggered relationship to one another thereby permitting a single filter tube to be backwashed at any particular time. The apparatus is quite simple, compact and inexpensive in construction, and yet at the same time is quite efficient and reliable in use.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Filtering apparatus for removing contaminants from a liquid comprising a filter housing, said filter housing including an inlet section and an outlet section, an inlet conduit in communication with said inlet section, an outlet conduit in communication said outlet section, a plurality of spaced filter tubes disposed within the outlet section, the opposite ends of each of said tubes within the outlet section being open to said inlet section, backwash means movably supported in said housing, said backwash means being movable into position to be in communication with opposite ends of one of said tubes at a particular time, the backwash means being movable so as to be in communication with the opposite open ends of different ones of said filter tubes in a sequential manner.

2. Apparatus as defined in claim 1 wherein said outlet section is defined by first and second spaced substantially parallel tube plate means and a tubular means, said housing including opposite end portions, said tube plate means being spaced from the opposite ends of said housing, each of said tube plate means having a plurality of holes formed therein for receiving filter tubes, said first and second tube plate means being substantially annular, said tubular means being connected between the inner portions of said first and second tube plate means to provide communication from said inlet conduit to each of said tube plate means, the opposite ends of said filter tubes being supported within the holes in said tube plate means.

3. Apparatus as defined in claim 2 wherein said tubes are of substantially cylindrical configuration and have discharge means formed therethrough substantially throughout the length thereof, said discharge means including longitudinally spaced and circumferentially spaced discharge portions about the outer periphery thereof for discharging from the inside of said tubes outwardly into said outlet section, said cylindrical tubes being disposed in substantially parallel relationship with one another with the outer periphery of each tube being disposed a substantial distance from the outer periphery of adjacent tubes.

4. Apparatus as defined in claim 3 wherein said backwash means includes a hollow portion extending longitudinally of said filter housing and being positioned within said tubular means and extending on opposite sides thereof, said hollow portion being spaced from said tubular means, means rotatably supporting said longitudinally extending hollow portion for rotation within said filter housing, a first radially extending hollow portion in communication with said longitudinally extending hollow portion, a second radially extending hollow portion in communication with said longitudinally extending hollow portion, said first and second radially extending hollow portions being spaced axially along said longitudinally extending hollow portion, each of said radially extending hollow portions being in communication with a longitudinally extending means which in turn is adapted to be disposed in communication with an open end of one of said filter tubes for backwashing the filter tubes.

5. Apparatus as defined in claim 4 wherein said last-mentioned longitudinally extending means comprises a sleeve portion in communication with one of said radially extending hollow portions, said sleeve portion having an open end, an inner sealing sleeve slidably disposed within each of said sleeve portions and extending through the open end thereof annular inlet ring means disposed adjacent each of said tube plate means and having inlet ports aligned with the open ends of said filter tubes, each of said inlet rings having a substantially planar sealing surface, means normally biasing said sealing sleeves into liquid-tight abutting relationship with one of said sealing surfaces, and actuating means exterior of said housing and connected with said movable backwash means for moving said sealing sleeves from a position in alignment with the opposite ends of one of said filter tubes to a position in alignment with the opposite ends of another of said filter tubes.

6. Apparatus as defined in claim 5 wherein said inlet section includes a removable cover for gaining access to the interior of the inlet section whereby said tubes may be readily removed by disassembly of a portion of the backwash means and said annular inlet ring means.

7. Apparatus as defined in claim 5 wherein the longitudinally extending hollow portion of said backwash means is rotatably journalled within one end portion of said housing, the opposite end portion of said longitudinally extending hollow portion of the backwash means extending outwardly of said housing, said actuating means being drivingly interconnected with that portion of the hollow portion of the backwash means extending outwardly of the housing.

8. Apparatus as defined in claim 7 including selectively operable valve means for controlling the flow of backwash liquid through said longitudinally extending hollow portion of the backwash means and outwardly of the housing.

9. Apparatus as defined in claim 5 wherein said filter tubes are disposed into concentric annular rows, the inner annular row of tubes being staggered with respect to the outer annular row of tubes so that the tubes of the inner and outer rows of tubes are not radially aligned with one another.

10. Apparatus as defined in claim 9 wherein each of said first and second radially extending hollow portions of the backwash means includes portions extending in different directions from said longitudinally extending hollow portion, said last-mentioned portions being of different radial length and each having longitudinally extending means thereon in communication with a particular annular row of tubes, the longitudinally extending means of one of the portions being adapted to be in communication with the outer row of tubes, and the longitudinally extending means of the other radial portion being adapted to be in communication with the inner row of tubes.

References Cited by the Examiner

UNITED STATES PATENTS

| | | | |
|---|---|---|---|
| 3,176,846 | 4/1965 | Adams | 210—333 |
| 3,280,980 | 10/1966 | King | 210—333 X |

REUBEN FRIEDMAN, *Primary Examiner.*

F. SPEAR, *Assistant Examiner.*